US011114125B1

(12) United States Patent
Yamane

(10) Patent No.: US 11,114,125 B1
(45) Date of Patent: Sep. 7, 2021

(54) DISC DEVICE WITH HEAD PLACEMENT RESPONSIVE TO SHOCK DETECTION

(71) Applicants: Kabushiki Kaisha Toshiba, Tokyo (JP); Toshiba Electronic Devices & Storage Corporation, Tokyo (JP)

(72) Inventor: Masami Yamane, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/998,091

(22) Filed: Aug. 20, 2020

(30) Foreign Application Priority Data

Feb. 18, 2020 (JP) .............................. JP2020-025241

(51) Int. Cl.
G11B 19/04 (2006.01)
G11B 21/12 (2006.01)
G11B 21/22 (2006.01)
G11B 5/55 (2006.01)
G11B 5/596 (2006.01)

(52) U.S. Cl.
CPC .......... *G11B 19/042* (2013.01); *G11B 5/5582* (2013.01); *G11B 5/59694* (2013.01); *G11B 19/04* (2013.01); *G11B 21/12* (2013.01); *G11B 21/22* (2013.01)

(58) Field of Classification Search
None
See application file for complete search history.

(56) References Cited

U.S. PATENT DOCUMENTS 7,529,056 B2   5/2009  Aoki et al.

FOREIGN PATENT DOCUMENTS

| JP | H3-29172 A | 2/1991 |
| JP | H4-248176 A | 9/1992 |
| JP | H8-203229 A | 8/1996 |
| JP | H8-221886 A | 8/1996 |
| JP | H10-320935 A | 12/1998 |
| JP | H11-353826 A | 12/1999 |
| JP | 2007-242110 A | 9/2007 |
| JP | 2008-226297 A | 9/2008 |

*Primary Examiner* — Craig A. Renner
(74) *Attorney, Agent, or Firm* — White & Case LLP

(57) ABSTRACT

According to one embodiment, a disk device includes a base, a discoidal recording medium including an innermost circumferential portion and an outer circumferential edge, a head, a head actuator provided pivotably on the base and supporting the head movably, a first sensor which detects a shock and a drive unit which pivots, when the shock detected by the first sensor is greater than a predetermined value and the head is located at a position less than a predetermined distance from the innermost circumferential portion, the head actuator to place the head at a position more than the predetermined distance which satisfies a conditional formula below.

$$D = 9.83 e^{-210 \frac{t^2}{G}}$$

10 Claims, 12 Drawing Sheets

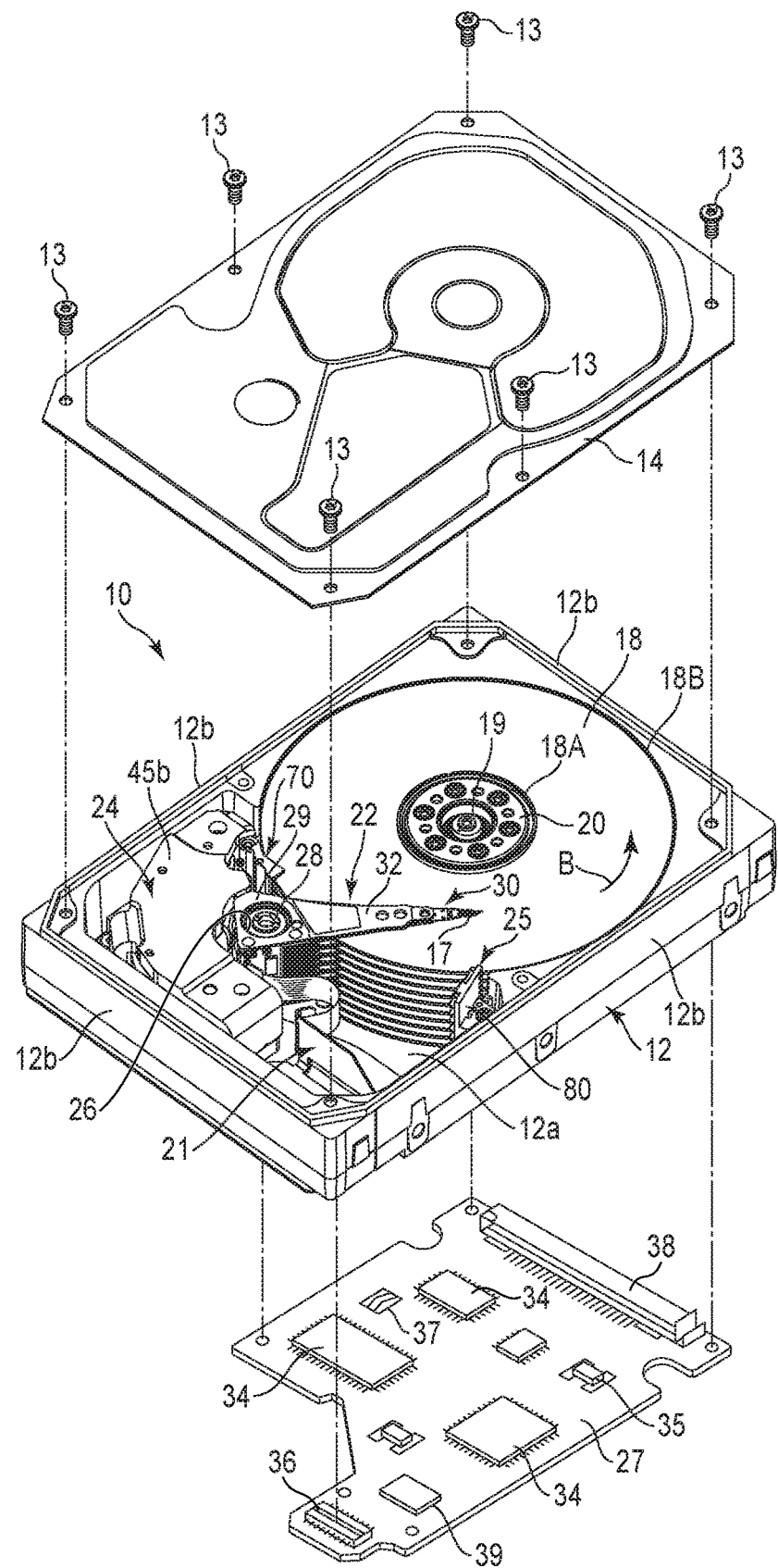
F I G. 1

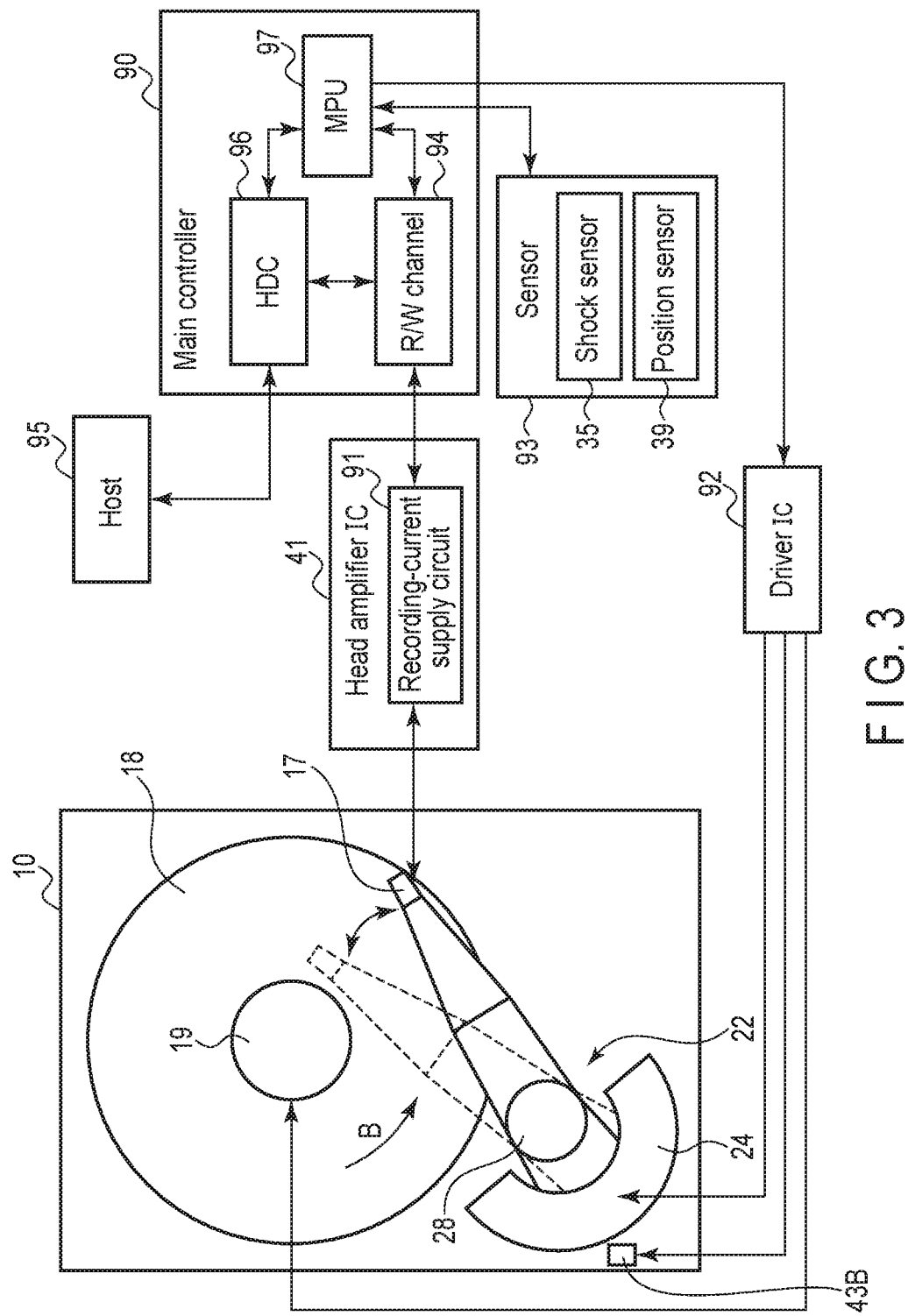
F I G. 3

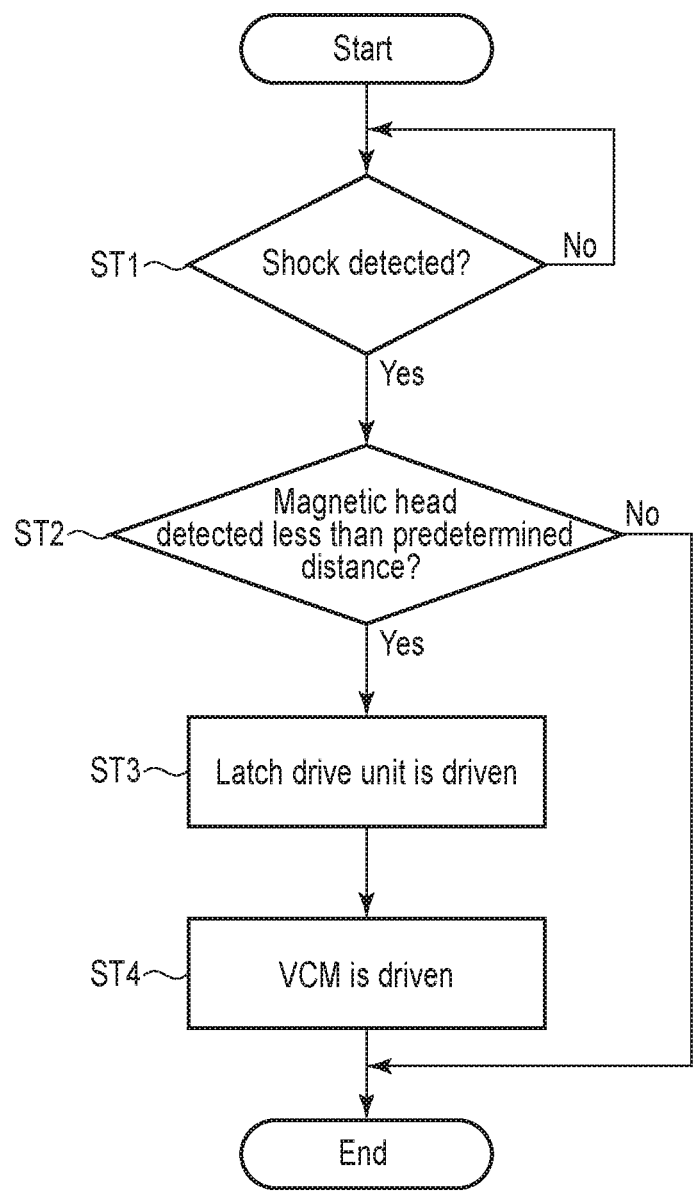
F I G. 9

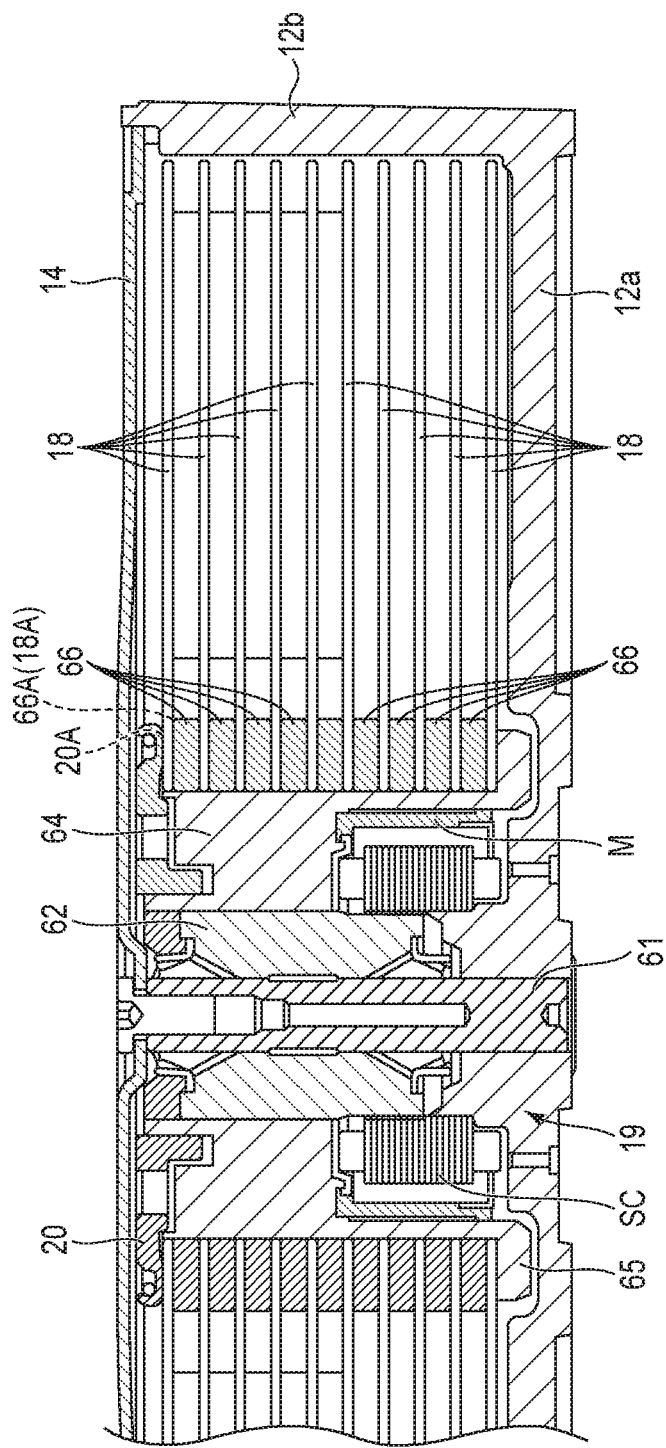
F I G. 10

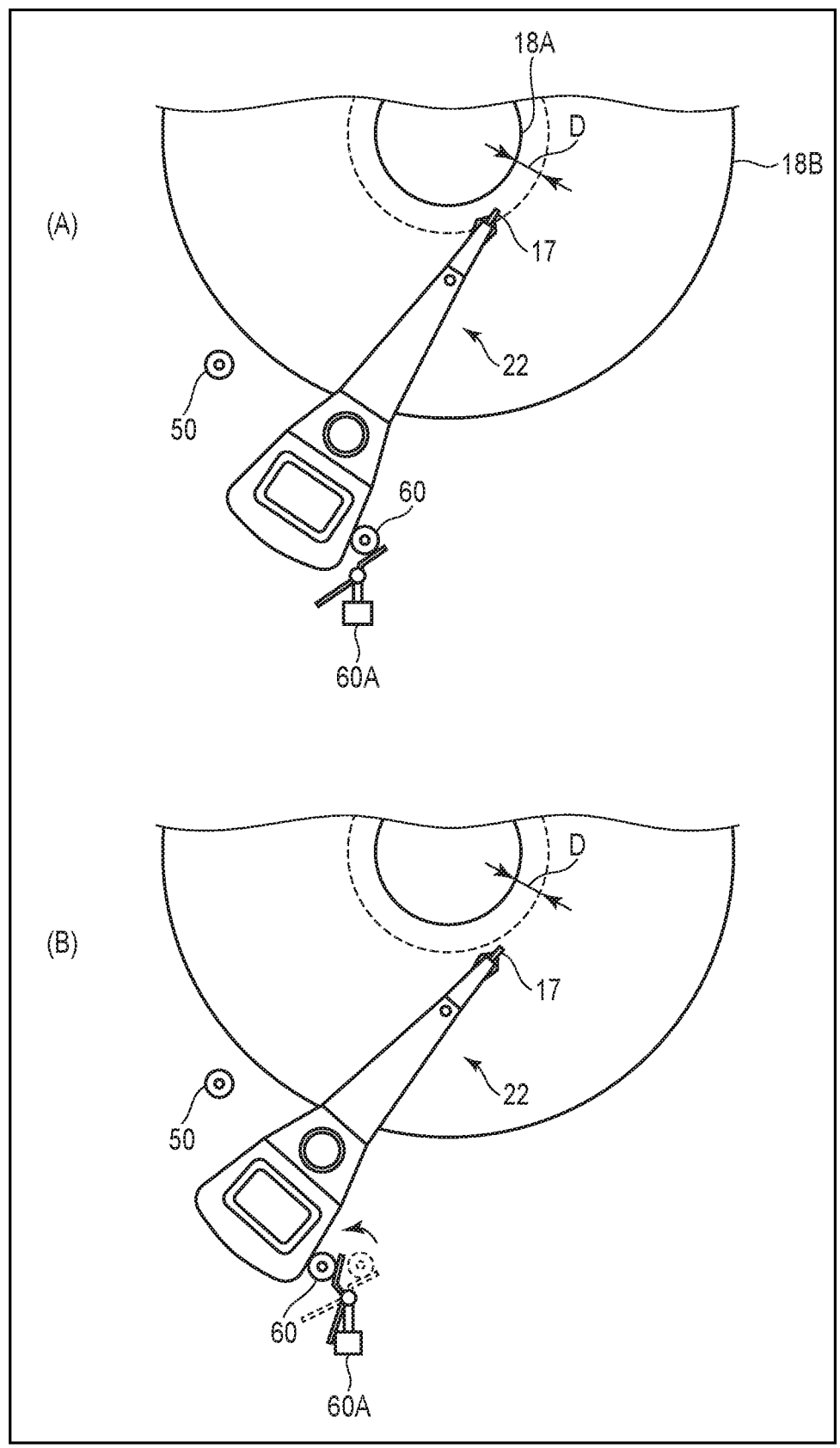
F I G. 11

DISC DEVICE WITH HEAD PLACEMENT RESPONSIVE TO SHOCK DETECTION

CROSS-REFERENCE TO RELATED APPLICATIONS

This application is based upon and claims the benefit of priority from Japanese Patent Application No. 2020-025241, filed Feb. 18, 2020, the entire contents of which are incorporated herein by reference.

FIELD

Embodiments described herein relate generally to a disk device.

BACKGROUND

As a disk device, for example, a hard disk drive (HDD) comprises a plurality of magnetic disks rotatably disposed in a housing, a plurality of magnetic heads which read or write data from/onto respective magnetic disks, and a head actuator which supports the magnetic heads movably with respect to magnetic disks.

The magnetic heads, while locating above the respective magnetic disks, fly above the respective magnetic disk. However, as the thickness of magnetic disks has been reduced recently, there may rise such a problem that the magnetic disk deforms when a shock is applied from outside of the disk device, and the respective magnetic head is disabled to follow the deformation of the magnetic disk and fly thereabove, and brought into contact with the magnetic disk, especially, in its inner circumferential side.

BRIEF DESCRIPTION OF THE DRAWINGS

FIG. 1 is an exploded perspective view of a hard disk drive (HDD) according to an embodiment when a cover is removed.

FIG. 3 is a block diagram schematically showing the HDD of the embodiment.

FIG. 9 is a flowchart illustrating the operation of the HDD of the first embodiment when a shock is detected.

FIG. 10 is a lateral cross-sectional view of the HDD taken along line E-E in FIG. 2.

FIG. 11 is a diagram showing the first modified example of the first embodiment.

DETAILED DESCRIPTION

In general, according to one embodiment, a disk device comprises a base, a discoidal recording medium supported rotatably by the base and including an innermost circumferential portion supported and an outer circumferential edge, a head which carries out data processing with respect to the recording medium, a head actuator provided pivotably on the base and supporting the head movably between the innermost circumferential portion and the outer circumferential edge, a first sensor which detects a shock applied and a drive unit which pivots, when the shock detected by the first sensor is greater than a predetermined value and the head is located at a position less than a predetermined distance from the innermost circumferential portion, the head actuator to place the head at a position more than the predetermined distance, and the predetermined distance satisfies a conditional formula (3) which will be provide later.

Embodiments will be described hereinafter with reference to the accompanying drawings. Note that the disclosure is a mere example, and arbitrary change of gist which can be easily conceived by a person of ordinary skill in the art naturally falls within the inventive scope. To more clarify the explanations, the drawings may pictorially show width, thickness, shape and the like, of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

First Embodiment

As a disk device, a hard disk drive (HDD) of an embodiment will be described in detail.

Figure 2:
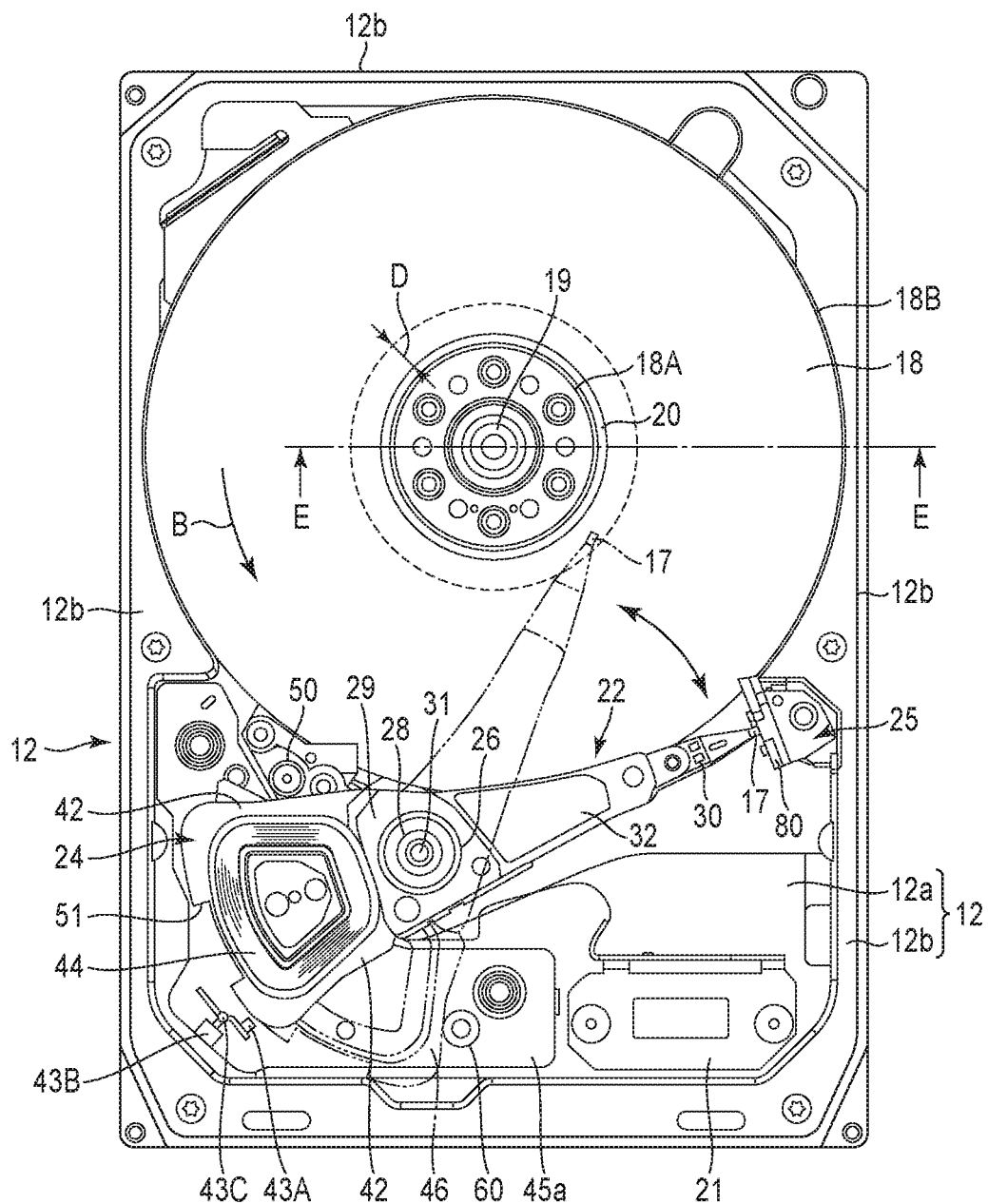
FIG. 2 is a plan view of the HDD without the cover.

FIG. 1 is an exploded perspective view of a hard disk drive (HDD) of this embodiment when a cover is removed. FIG. 2 is a plan view of the HDD without the cover. FIG. 3 is a block diagram schematically showing the HDD of the embodiment.

As shown in FIG. 1, the HDD comprises a rectangular housing 10. The housing 10 comprises a rectangular box-shaped base 12 with an upper surface opened and a cover (top cover) 14. The base 12 includes a rectangular bottom wall 12a and a side wall 12b standing along a periphery portion of the base wall, which are, for example, formed as an integral body of aluminum. The cover 14 is formed, for example, into a rectangular plate shape of stainless steel. The cover 14 is fixed on the side wall 12b of the base 12 with a plurality of screws 13 to airtightly close the upper opening of the base 12.

As shown in FIGS. 1 and 2, the housing 10 accommodates, therein, a plurality of magnetic disks 18 as discoidal recording media and a spindle motor 19 which rotatably supports the magnetic disks 18 to the base 12 to rotate them. The spindle motor 19 is disposed on the base wall 12a. The magnetic disks 18 each are formed from a nonmagnetic material of, for example, a disk shape having a diameter of 95 mm (3.5 inches), and comprise, for example, a substrate of aluminum and magnetic recording layers formed respectively on upper and lower surfaces of the substrate. The magnetic disks 18 are fit on a hub of the spindle motor 19, which will be described later, so as to be coaxial with each other and are further clamped by a clamp spring 20. Thus, the magnetic disks 18 are supported parallel to the bottom wall 12a of the base 12. The magnetic disks 18 are rotated at a predetermined number of revolutions by the spindle motor 19 in a direction indicated by an arrow B. The magnetic disks 18 each comprise an innermost circumferential portion 18A supported by the clamp spring 20 or a spacer-ring, which will be described later, and an outer circumferential edge 18B, which is an outer rim of the magnetic disk 18. The definition of the innermost circumferential portion 18A will be described in detail with reference to FIG. 10.

The housing 10 accommodates therein, a plurality of magnetic heads 17 which performs data processing such as recording, reproduction or the like of data on the respective magnetic disks 18 and a head actuator 22 which supports the magnetic heads 17 with respect to the respective magnetic disk 18 so as to be movable between the innermost circumferential portion 18A and the outer circumferential edge 18B. Further, the housing 10 accommodates therein a voice coil motor (VCM) 24 which pivots and positions the head actuator 22, a ramp load mechanism 25 which maintains a respective magnetic head 17 at an unload position spaced from the respective magnetic disk 18 when the magnetic head 17 moves to the outermost circumference of the magnetic disk 18, a flexible printed circuit unit (FPC unit) 21 on which electronic components such as conversion connectors are mounted, and a spoiler 70.

The HDD comprises a printed circuit board 27. The printed circuit board 27 is fixed on an outer surface of the bottom wall 12a of the base 12 with screws, so as to oppose the bottom wall 12a of the base 12 with a slight gap therebetween. Between the outer surface of the bottom wall 12a of the base 12 and the printed circuit board 27, an insulating sheet (or an insulating film) (not shown) is disposed as an insulating member.

On an inner surface (a surface on a side opposing the base 12) of the printed circuit board 27, electronic components are mounted, which include a plurality of semiconductor devices 34 and semiconductor chips which constitute a control unit, shock sensors (rotational vibration sensor, acceleration sensor) which detect a shock acting on the HDD, and the like. Further, in this embodiment, for example, a position sensor 39 which detects the position of a magnetic head 17 with relation to the respective magnetic disk 18 is mounted on the printed circuit board 27. In a longitudinal end side of the printed circuit board 27, a connector 36 is provided, and an interface connector 38 connectable to an external device is mounted on the other longitudinal end side of the printed circuit board 27. A connecting terminal 37 for the spindle motor 19 is provided in a longitudinal central portion of the printed circuit board 27.

When the printed circuit board 27 is attached to the base 12, the connector 36 is connected to the conversion connector mounted on the FPC unit 21. Further, the connecting terminal 37 is connected to connection terminals coupled to the spindle motor 19. The control unit of the printed circuit board 27 controls the operations of the VCM 24 and the magnetic heads 17 via the FPC unit 21 and also controls the operation of the spindle motor 19 via the connecting terminal 37.

Note that in the example illustrated, the shock sensor 35 and the position sensor 39 are located on the printed circuit board 27, but the installation sites are not limited to those of the example.

The head actuator 22 includes an actuator block 29 rotatably provided in the base 12 and comprising a through hole 26, a bearing unit 28 provided in the through hole 26 and provided rotatably on the bottom wall 12a of the base 12, a plurality of arms 32 extending out from the actuator block 29 and suspensions 30 extending from the arms 32, respectively, and the respective magnetic heads 17 are supported by distal end portions of the respective suspensions 30. A support shaft (axle) 31 provided to stand on the bottom wall 12a of the base 12. The actuator block 29 is rotatably supported around the support shaft 31 by the bearing unit 28. The head actuator 22 includes a support frame 42 extending from the actuator block 29 to a direction opposite to the arms 32. A voice coil 44, which constitutes a part of the VCM 24, is provided in the head actuator 22, and the voice coil 44 is supported to the support frame 42. The VCM 24 further comprises a pair of yokes 45a and 45b provided on the bottom wall 12a of the base 12 and a magnet 46 fixated on at least one of the yokes. FIG. 2 illustrates the state where one of the yokes, the yoke 45b is removed.

The yoke 45a of the VCM 24 is placed and fixed on the bottom wall 12a of the base 12. The other yoke 45b is disposed to oppose the yoke 45a with a gap therebetween. The voice coil 44 of the VCM 24 is disposed between the pair of yokes 45a and 45b so as to oppose the magnet 46. By applying electric current to the voice coil 44, a magnetic field is produced, and the magnetic field interacts with a magnetic field of the magnet 46 to pivot the head actuator 22.

The housing 10 accommodates, therein, an outer stopper 50 and an inner stopper 60, configured to regulate a rotation range of the head actuator 22. The outer stopper 50 is provided to stand on the bottom wall 12a of the base 12, which functions as a supporting member and is disposed in the vicinities of the magnetic disk 18 and the yoke 45a. When the head actuator 22 is pivoted clockwise to move the respective magnetic head 17 from the outer circumferential edge of the respective magnetic disk 18 to the position where the disk strands the ramp 80 of the ramp load mechanism 25 as indicated by a solid line in FIG. 2, the support frame 42 of the head actuator 22 abuts against the outer stopper 50. Thus, the outer stopper 50 regulates the head actuator 22 from further pivoting and thus defines the outer-side moving range of the head actuator 22 and the magnetic head 17.

The inner stopper 60 is provided to stand between the yokes 45a and 45b, which function as support members and is disposed on an opposite side to the outer stopper 50 while interposing the head actuator 22 therebetween. When the head actuator 22 is pivoted counterclockwise to move the magnetic head 17 to a position in the vicinity of the inner circumferential edge of the respective magnetic disk 18 as indicated by a two-dot chain line in FIG. 2, the support frame 42 of the head actuator 22 abuts against the inner stopper 60. Thus, the inner stopper 60 regulates the head actuator 22 from further pivoting and thus defines the inner-side moving range of the head actuator 22 and the magnetic head 17.

In this embodiment, the HDD includes a latch 43A supported on the base 12 so as to be movable to a head actuator 22 side and a latch drive unit 43B which moves the latch 43A. In the example illustrated, the latch 43A comprises a supporting point 43C and pivots with respect to the supporting point 43C. Further, the head actuator 22 comprises an engagement portion 51 with which the latch 43A can engage. The engagement portion 51 is, for example, a groove formed in the support frame 42, which, though, is not limited to this example. The operation of the latch 43A engaging with the engagement portion 51 will be described in detail with reference to FIG. 8. The latch 43A is disposed at a position where it is abuttable to the head actuator 22 while the head actuator 22 is abutting against the inner stopper 60 and while the head actuator 22 is abutting against the outer stopper 50. Further, the latch 43A is an electromagnetic latch or a latch to be driven by a piezoelectric element.

As shown in FIG. 3, the HDD comprises a head amplifier IC 41 which drives the magnetic heads 17, a main controller 90 and a driver IC 92. The head actuator 22 is provided in, for example, the head amplifier IC 41 so as to be electrically connected to the magnetic heads 17. The head amplifier IC 41 comprises a recording-current supply circuit 91 which supplies a recording current to a recording coil of each magnetic head 17.

The main controller 90 and the driver IC 92 are constituted, for example, on the printed circuit board 27. The main controller 90 includes a read write (R/W) channel 94, a hard disk controller (HDC) 96 and a micro processing unit (MPU) 97. The main controller 90 is electrically connected to the magnetic heads 17 via the head amplifier IC 41. The main controller 90 is electrically connected to the VCM 24, the spindle motor 19 and the latch drive unit 43B via the driver IC 92. The HDC 96 is connectable to the host computer 95. Further, sensors 93 including the shock sensor 35 and the position sensor 39 shown in the FIG. 1 are electrically connected to the MPU 97.

Next, an object of the embodiment will be described with reference to graphs of FIGS. 4 to 7. Note that the graphs shown in FIGS. 4 to 6 are based on the data of the case where the diameter of the magnetic disks 18 is 3.5 inches, the thickness of the magnetic disks 18 is 0.6 mm, and the value of shock applied is 70G.

Figure 4:
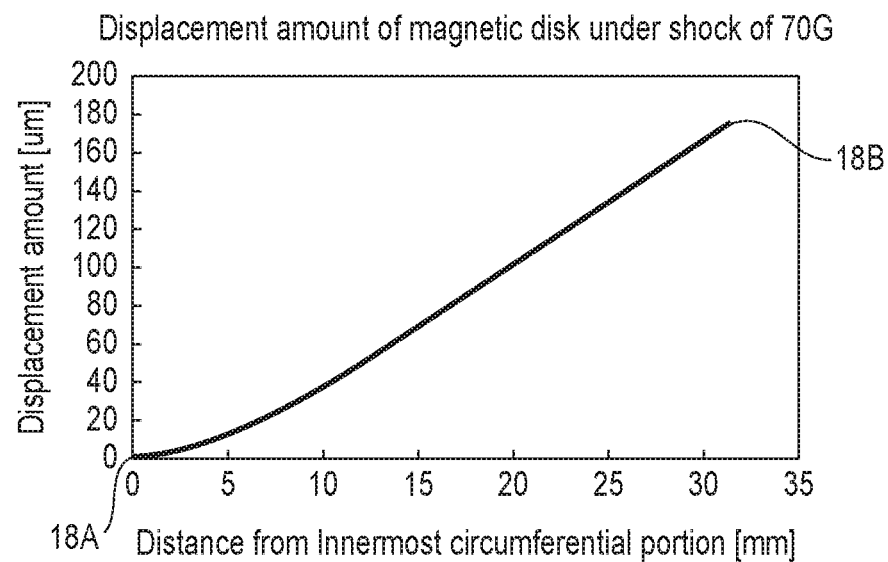
FIG. 4 is a graph illustrating an amount of displacement of a magnetic disk when a shock of 70G is applied to the HDD.

FIG. 4 is a graph showing the amount of displacement of the respective magnetic disk 18 when a shock of 70G is applied to the HDD. The horizontal axis indicates the distance from the innermost circumferential portion 18A, and the vertical axis indicates the amount of displacement of the magnetic disk 18.

As shown in this case, the amount of displacement in the innermost circumferential portion 18A is 0 μm and the amount of displacement in the outer circumferential edge 18B is approximately 180 μm. Thus, the amount of displacement increases from the innermost circumferential portion 18A towards the outer circumferential edge 18B. The curvature of the magnetic disk 18 at this time is calculated to be so as shown in FIG. 5.

Figure 5:
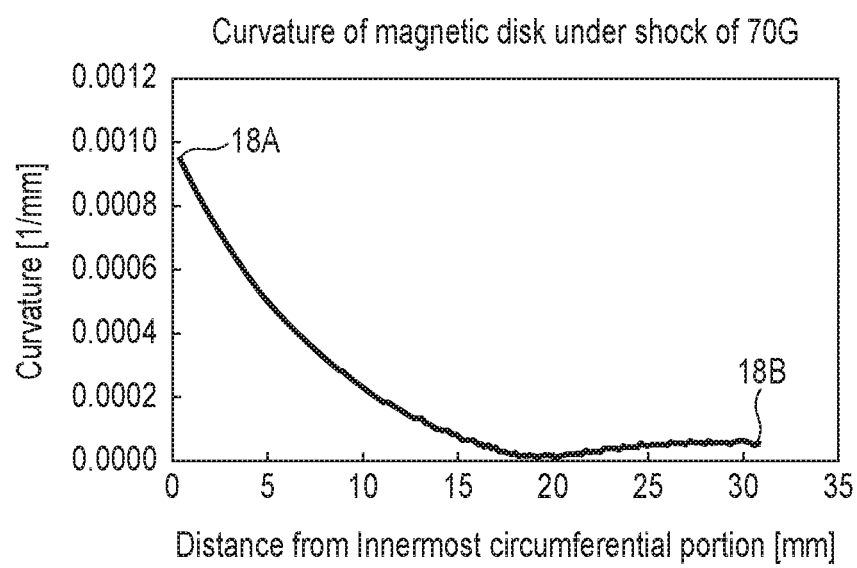
FIG. 5 is a graph illustrating a curvature of a magnetic disk when a shock of 70G is applied to the HDD.
Figure 6:
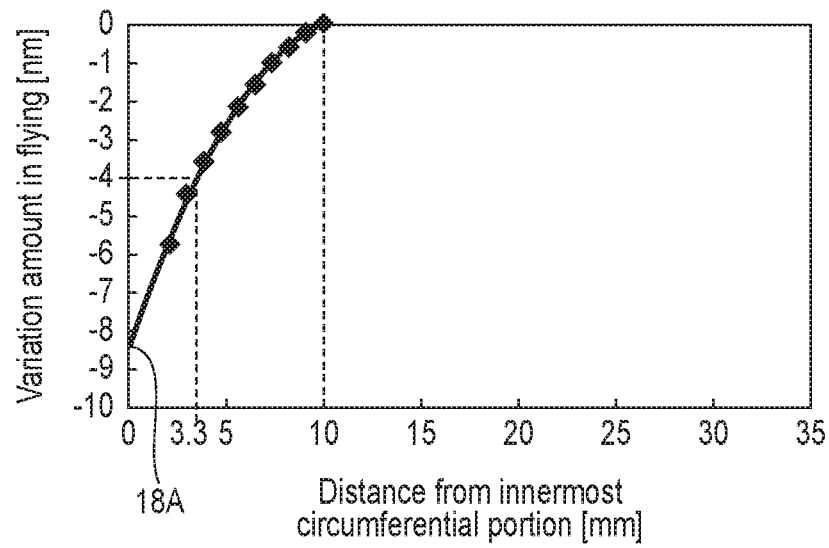
FIG. 6 is a graph illustrating a change in flying amount of a magnetic head when a shock of 70G is applied to the HDD.

FIG. 5 is a graph showing curvature of the magnetic disk 18 when a shock of 70G is applied to the HDD. The horizontal axis indicates the distance from the innermost circumferential portion 18A, and the vertical axis indicates the curvature of the magnetic disk 18.

On the contrary to the case of the amount of displacement shown in FIG. 4, the curvature increases as the site is closer to the innermost circumferential portion 18A. That is, the magnetic disk 18 under a shock curves greater as closer to the innermost circumferential portion 18A and flattens as closer to the outer circumferential edge 18B. In the amount of displacement shown in FIG. 4, an innermost circumferential portion 18A side is curved, and an outer circumferential edge 18B side is flattened. An amount of variation in flying of the magnetic head 17 at this time is so as shown in FIG. 6.

FIG. 6 is a graph showing the amount of variation in flying of the magnetic head 17 when a shock of 70G is applied to the HDD. The horizontal axis indicates the distance from the innermost circumferential portion 18A, and the vertical axis indicates the amount of variation in flying of the magnetic head 17 from the respective magnetic disk 18. Note that, in the graph shown in FIG. 6, a flying amount of the magnetic head 17 before application of the shock is set as 0 nm.

The flying amount of the magnetic head 17 decreases as closer to the innermost circumferential portion 18A. In other words, as the curvature of the magnetic disk 18 is greater, it is more difficult for the magnetic head 17 to follow deformation of the magnetic disk 18, increasing the chance of contacting the magnetic disk 18. Meanwhile, when the distance from the innermost circumferential portion 18A is 10 mm or more, and the flying amount of the magnetic head 17 does not vary. That is, it can be read from the graph, in case of a shock being applied, if the magnetic head 17 evades 10 mm or more to the outer circumferential side from the innermost circumferential portion 18A, the risk of the magnetic head 17 being brought into contact with the magnetic disk 18 can be avoided.

As shown in FIG. 6, under a shock, there is a risk that the magnetic head 17 may be brought into contact with the magnetic disk 18 in an inner circumferential side (within 10 mm from the innermost circumferential portion 18A) of the magnetic disk 18. In order to solve this, in this embodiment, the magnetic head 17 is operated to evacuate from the region where there is a risk of contacting the magnetic disk 18 when a shock is applied to the HDD. The region where there is a risk of contact is defined in a range from the innermost circumferential portion 18A to a predetermined distance D and is a range between the innermost circumferential portion 18A and a dotted line on a predetermined distance D shown in FIG. 2.

For example, an average flying amount of the magnetic heads 17 is approximately 10 nm with a dispersion of ±3 nm. A minimum flying amount in which the magnetic head 17 can stably fly about the surface of the magnetic disk 18 is approximately 3 nm. In order to secure 6 nm, which is a total of the minimum flying amount of the magnetic head 17, 3 nm and the dispersion amount, 3 nm, an amount of variation in flying which can be allowed is set to −4 nm from the from original flying amount, 10 nm. In this case, as shown in FIG. 6, the condition for the magnetic head 17 not contacting the magnetic disk 18 is that it is located 3.3 mm or more away from the innermost circumferential portion 18A.

When the head actuator 22 abuts against the inner stopper 60, the magnetic head 17 is located closest to the innermost circumferential portion 18A. At this time, the magnetic head 17 is located approximately 1.5 mm away from a respective spacer ring 66 (shown in FIG. 10) so as not to be brought into contact therewith. However, at this time, the magnetic head 17 is located in an inner circumference side with respect to the allowable predetermined distance D (=3.3 mm). In other words, as shown in FIG. 2, while the head actuator 22 abutting against the inner stopper 60, the magnetic head 17 is located in the inner side with respect to the predetermined distance D.

Next, the predetermined distance D described above will be calculated out.

The predetermined distance D varies along with the thickness of the magnetic disks 18 and the value of shock applied. Formula (1) provided below is an approximation formula for the predetermined distance D and the amount h of variation in flying where D: predetermined distance from the innermost circumferential portion 18A and h: amount of variation in flying.

[Mathematical Formula 1]

$$D = 9.83 e^{0.271h} \quad (1)$$

An amount of deformation of the magnetic disks 18 increases in proportion to the value of shock. Further, it is inversely proportional to the square of the thickness of the magnetic disks 18. The amount h of variation in flying changes proportional to deformation of the magnetic disk 18, and therefore the amount h of variation in flying is in proportion to the value of shock and is inversely proportional to the square of the thickness of the magnetic disks 18. Thus, formula (2) is obtained to represent the relationship between the predetermined distance D, shock value G, thickness t of the magnetic disks, where G: the value of shock and t: the thickness of the magnetic disks:

[Mathematical Formula 2]

$$D = 9.83 e^{52.6 \frac{t^2}{G} h} \quad (2)$$

Here, the following formula (3) is obtained when the allowable amount h of variation in flying (=−4 nm) is applied to the formula (2):

[Mathematical Formula 3]

$$D = 9.83 e^{-210 \frac{t^2}{G}} \quad (3)$$

Figure 7:
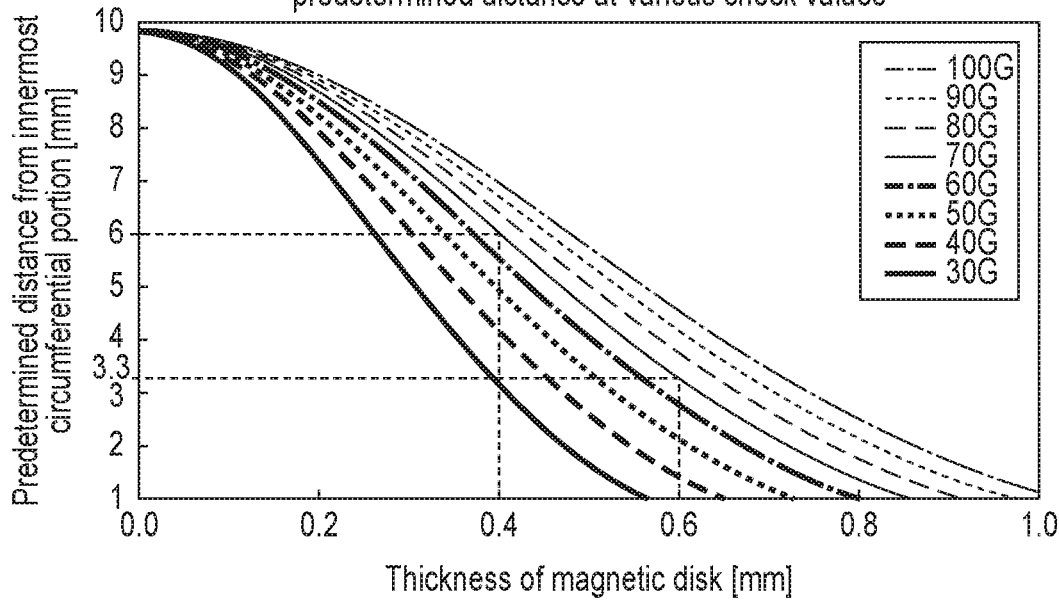
FIG. 7 is a graph indicating a relationship between the thickness of the magnetic disk and a predetermined distance from the innermost circumferential portion for each shock value.

The relationship between the predetermined distance D and the thickness t of the magnetic disk can be indicated by the graph shown in FIG. 7 from the formula (3).

FIG. 7 is a graph showing the relationship between the thickness of the magnetic disks and the predetermined distance D from the innermost circumferential portion 18A for each value of shock. The horizontal axis indicates the thickness of the magnetic disks, and the vertical axis indicates the predetermined distance D from the innermost circumferential portion 18A.

As the thickness of the magnetic disks is less, the predetermined distance D to evade becomes greater. For example, when the shock value is 70G and the thickness of the magnetic disks is 0.6 mm, it suffices if the magnetic head is retracted to an outer circumferential side with respect to the predetermined distance D (=3.3 mm or greater), but when, for example, the shock value is 70G and the thickness of the magnetic disks is less as 0.4 mm, the magnetic head must be retracted to an outer circumferential side with respect to the predetermined distance D (=6 mm or greater). Note here that, as shown in FIG. 6, the flying amount does not vary in any position 10 mm or more outward from the innermost circumferential portion 18A, and therefore when retracted to a position 10 mm or more away therefrom, the thickness of the magnetic disks does not make influence. Thus, the maximum value of the predetermined distance D is 10 mm. In other words, the predetermined distance D takes a value within 10 mm.

As described above, if a shock is applied to the HDD, it is possible to inhibit the magnetic head from being brought into contact with the respective magnetic disk by retracting the magnetic head to a position located at or further from the predetermined distance D which satisfies the formula (3). The embodiment is effective particularly when the thickness of the magnetic disks is 0.8 mm or less, and therefore the thickness of the magnetic disks of the embodiment is set to 0.8 mm or less.

Next, the operation of the embodiment will be described.

Figure 8:
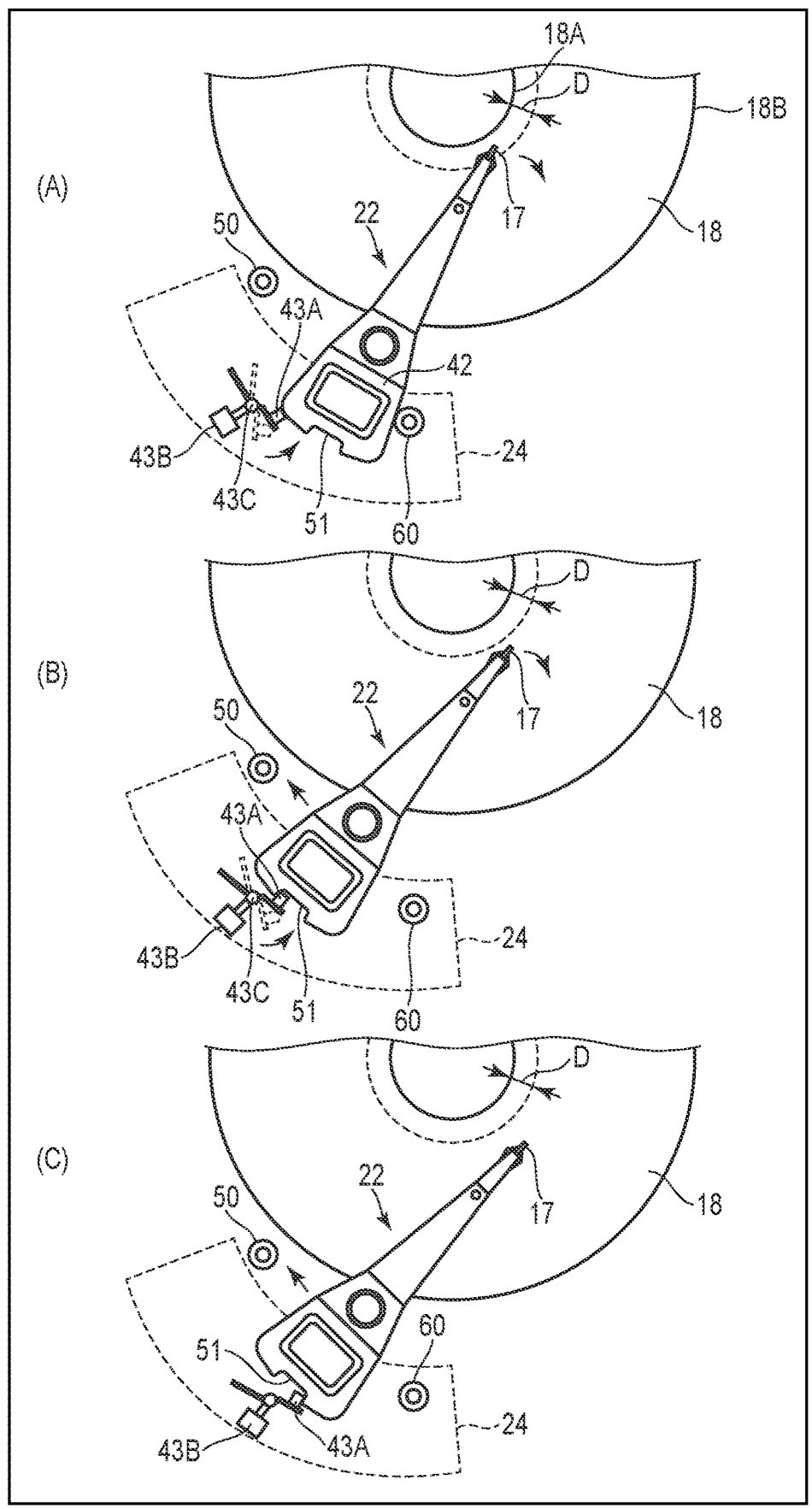
FIG. 8 is diagram illustrating the operation of the head actuator and a latch when a shock is detected.

FIG. 8 is a diagram illustrating the operation of the head actuator 22 and the latch 43A when a shock is detected.

First, the shock sensor 35 shown in FIG. 1 detects a shock applied to the HDD. When a shock greater than of the predetermined value is detected by the shock sensor 35, and further the magnetic head 17 is located less than the predetermined distance D from the innermost circumferential portion 18A as shown in FIG. 8, part (A), the latch drive unit 43B moves the latch 43A towards a head actuator 22 side, to abut against the head actuator 22. At this time, the latch 43A abuts against an outer portion of the engagement portion 51 in the support frame 42. In the example illustrated, the latch 43A is configured to pivot on the supporting point 43C as its center, but the configuration of the latch 43A is not limited to this example.

Next, as shown in FIG. 8, part (B), the VCM 24 pivots the head actuator 22 to an outer circumferential side. Here, the VCM 24 pivots the head actuator 22 based on the information that the magnetic head 17 is detected to be located within the predetermined distance D from the innermost circumferential portion 18A by the position sensor 39 shown, for example, in FIG. 1. The latch 43A is being urged with a force to move to the head actuator 22 side by the latch drive unit 43B and is moved into the engagement portion 51.

Next, as shown in FIG. 8, part (C), the VCM 24 pivots the head actuator 22 further towards the outer circumferential side. The, the latch 43A is caught on an edge of the engagement portion 51, to be engaged. While the latch 43A is engaged with the engagement portion 51, the magnetic head 17 is located in a position at or further from the predetermined distance D. The predetermined distance D satisfies the conditional formula (3).

According to this embodiment, when a shock is detected, the magnetic heads 17 are retracted to positions at or further than the predetermined distance D. Thus, it is possible to inhibit the magnetic heads 17 from being brought into contact with the respective magnetic disks 18 in in the inner circumferential side of the magnetic disk 18, where the curvature of the deformation is greater. Therefore, the magnetic disks 18 can be protected from being damaged. Further, with the latch 43A as it engaging with the engagement portion 51, it is possible to inhibit the magnetic heads 17 from stranding the ramp 80 and also inhibit the magnetic heads 17 from returning to within the predetermined distance D. That is, the magnetic heads 17 can be maintained in positions at or further than the predetermined distance D and also less than the conditional formula (3).

FIG. 9 is a flowchart illustrating the operation of the HDD of the first embodiment when a shock is detected. Hereinafter, the operation of the HDD will be described with reference to FIGS. 1 to 3 and 8.

The main controller 90 judges whether a shock greater than of a predetermined value is detected in the shock sensor 35 (ST1). When the main controller 90 judges that the shock detected in the shock sensor 35 is greater than of the predetermined value (YES in ST1), it further judges in the position sensor 39 whether or not the magnetic heads 17 are located less than the predetermined distance D from the innermost circumferential portion 18A (ST2). When the main controller 90 judges in the position sensor 39 that the magnetic heads 17 are located less than the predetermined distance D from the innermost circumferential portion 18A (YES in ST2), it drives the latch drive unit 43B by the driver IC 92 (ST3). The latch drive unit 43B moves the latch 43A to abut against the head actuator 22. The main controller 90 drives the VCM 24 via the driver IC 92 to pivot the head actuator 22 so that the magnetic heads 17 are located at or further than the predetermined distance D (ST4). Thus, as shown in FIG. 8, the latch 43A is engaged with the engagement portion 51.

Note that when main controller 90 does not detect in the position sensor 39 that the magnetic heads 17 are located less than the predetermined distance D (NO in ST2), the latch drive unit 43B and the VCM 24 are not driven.

Next, the definition of the innermost circumferential portion 18A of the magnetic disks 18 will be described.

FIG. 10 is a lateral cross-section of the HDD taken along line E-E in FIG. 2.

For example, the spindle motor 19 comprises an axle 61 standing substantially perpendicular on the bottom wall 12a, a cylindrical rotating shaft 62 supported rotatably around the axle 61, a substantially cylindrical hub 64 fixed to coaxially surround the rotating shaft 62, a stator coils SC fixed to the bottom wall 12a and disposed around the rotating shaft 62 and a cylindrical magnet M attached to an inner circumferential surface of the hub 64 so as to oppose the stator coils SC. The hub 64 includes an outer circumferential surface located coaxially with the axle 61 and an annular flange 65 formed to be integrated with a lower end (an end on a bottom wall 12a side) of the outer circumferential surface.

The magnetic disks 18 are each engaged with the outer circumferential surface of the hub 64 while the hub 64 is penetrated through an inner hole of the disk. Further, annular spacer-rings 66 are each mounted on the outer circumferential surface of the hub 64 and interposed between each respective adjacent pair of magnetic disks 18. The spacer-rings 66 are located coaxially with the clamp spring 20 and are in contact with the magnetic disks 18, respectively. The magnetic disks 18 and the spacer-rings 66 are disposed alternately in the order on the flange 65 of the hub 64 and attached to the hub 64 while they are stack one on another. With the clamp spring 20 attached to an upper end of the hub 64, the inner circumferential portions of the magnetic disk 18 and the spacer-ring 66 are pushed to a flange 65 side, and thus the magnetic disk 18 are fixed in a stack layer state with a predetermined gap between each adjacent pair thereof. Thus, the magnetic disks 18 are supported rotatably to be integrated with the rotating shaft 62 and the hub 64. The magnetic disks 18 are supported parallel to each other with a predetermined gap therebetween, and also approximately parallel to the bottom wall 12a. Note that, in the example illustrated, the number of magnetic disks 18 loaded is ten, but the number is not limited to this and it may be nine or less or eleven or more.

The innermost circumferential portion 18A of each magnetic disk 18 is defined by an outermost circumferential position 20A of the part of the clamp spring 20, which is brought into contact with the magnetic disk 18 or an outermost circumferential position 66A of the respective spacer-ring 66. When the outermost circumferential position 20A of the clamp spring 20 is located on an outer circumferential side further than the outermost circumferential position 66A of the spacer-ring 66, the innermost circumferential portion 18A of the magnetic disk 18 is defined by the outermost circumferential position 20A of the clamp spring 20. Further, when the outermost circumferential position 66A of the spacer-ring 66 is located on an outer circumferential side further than the outermost circumferential position 20A of the clamp spring 20, the innermost circumferential portion 18A of the magnetic disk 18 is defined by the outermost circumferential position 66A of the spacer-ring 66. In the example shown in FIG. 10, the outermost circumferential position 66A of each spacer-ring 66 is located on an outer circumferential side further than the outermost circumferential position 20A of the clamp spring 20, the outermost circumferential position 66A of each spacer-ring 66 is defined as the innermost circumferential portion 18A of the respective magnetic disk 18. When a shock is applied to the HDD, the innermost circumferential portion 18A becomes the origin of deformation of the magnetic disk 18.

FIG. 11 is a diagram showing the first modified example of the first embodiment. The first modified example shown in FIG. 11 is different from the first embodiment described above in that the magnetic head 17 is retracted outward further from the predetermined distance D by moving the position of the inner stopper 60.

The inner stopper 60 shown in FIG. 11 is movable to a head actuator 22 side. The inner stopper 60 is moved by an inner stopper drive unit 60A. For the inner stopper drive unit 60A, for example, a driving method similar to that of the electromagnetic latch described above or the latch driven by the piezo electric element may be applied. Further, in the example illustrated, the inner stopper drive unit 60A is configured to pivot on the supporting point as its axis, but the configuration of the inner stopper drive unit 60A is not limited to that of this example.

First, the shock sensor 35 shown in FIG. 1 detects a shock applied to the HDD. When the shock is detected to be greater than of the predetermined value by the shock sensor 35, and also the magnetic head 17 is located less than the predetermined distance D from the innermost circumferential portion 18A as shown in FIG. 11, part (A), the inner stopper drive unit 60A pushes and moves the inner stopper 60 to abut against the head actuator 22, and thus pivots the magnetic head 17 towards the outer circumferential side. As shown in FIG. 11, part (B), the magnetic head 17 is located at a position at or further from the predetermined distance D in the state that the inner stopper 60 pushes the head actuator 22 all the way through. Note that in the first modified example shown in the FIG. 11, the head actuator 22 is pivoted by the inner stopper drive unit 60A, and therefore it is not necessary to drive the VCM.

Figure 12:
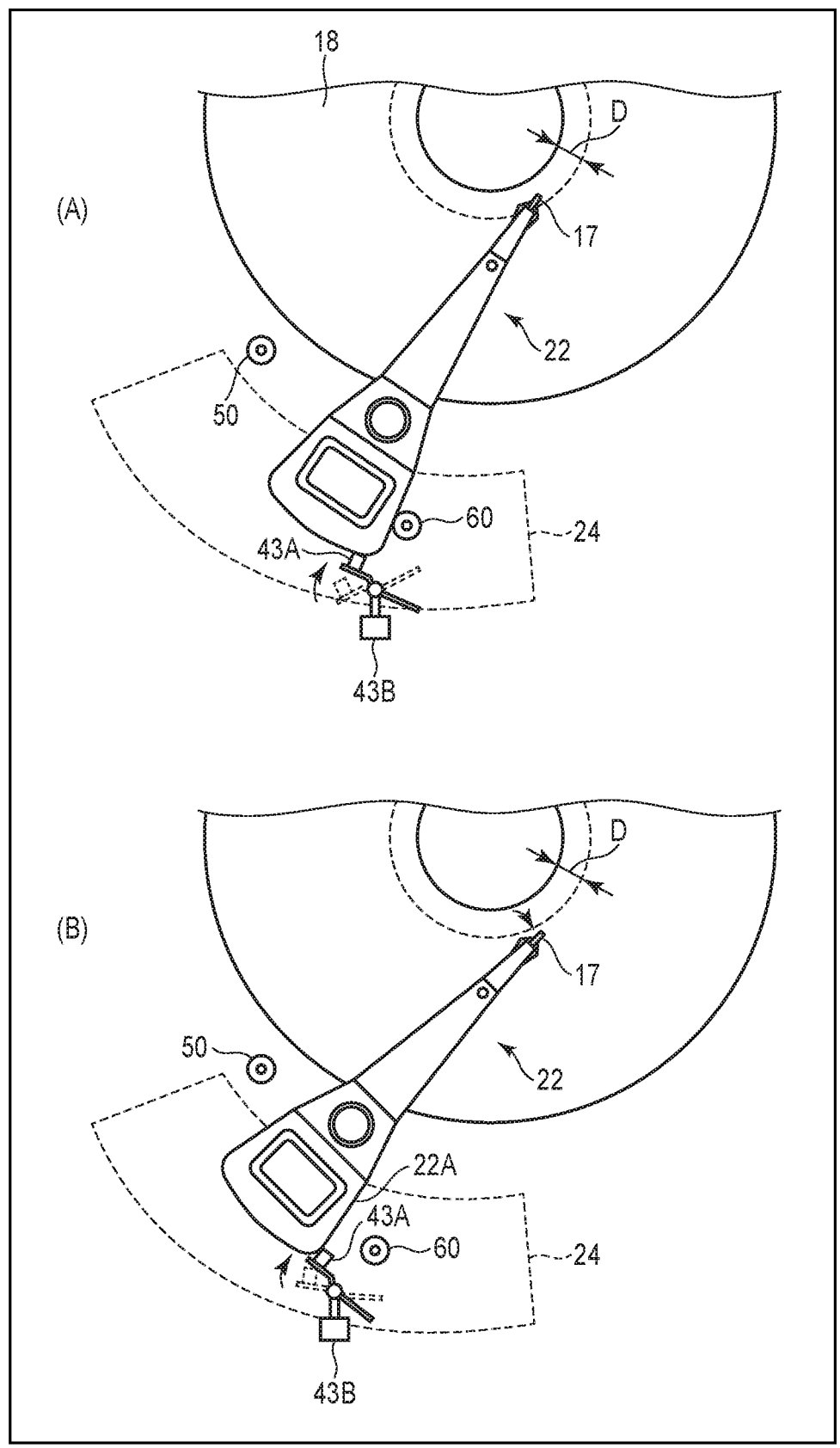
FIG. 12 is a diagram showing the second modified example of the first embodiment.

FIG. 12 is a diagram showing the second modified example of the first embodiment. The second modified example shown in FIG. 12 is different from the first embodiment described above in the position of the latch 43A. Further, the groove with which the latch 43A engages is not formed in the head actuator 22.

First, the shock sensor 35 shown in FIG. 1 detects a shock applied to the HDD. When the shock is detected to be greater than of the predetermined value by the shock sensor 35, and also the magnetic head 17 is located less than the predetermined distance D from the innermost circumferential portion 18A as shown in FIG. 12, part (A), the latch drive unit 43B moves the latch 43A to the head actuator 22 side so as to abut against the head actuator 22.

Next, as shown in FIG. 12, part (B), the VCM 24 pivots the head actuator 22 to the outer circumferential side. The latch 43A is being urged with a force to move to the head actuator 22 side by the latch drive unit 43B and is moved to a position opposing a side surface 22A of the head actuator 22. The side surface 22A of the head actuator 22 opposes the inner stopper 60. The latch drive unit 43B urges the latch 43A to abut against the head actuator 22 between the inner stopper 60 and the head actuator 22. While the latch 43A abutting against the side surface 22A of the head actuator 22, the magnetic head 17 is located in a position at or further than the predetermined distance D.

Of the configurations of the first embodiment shown in FIGS. 8, 11 and 12, the VCM 24 functions as a drive unit configured to retract the magnetic head 17 from within the predetermined distance D in FIGS. 8 and 12, whereas the inner stopper drive unit 60A functions as a drive unit configured to retract the magnetic head 17 from within the predetermined distance D in FIG. 11.

Second Embodiment

The second embodiment is configured to inhibit, when a shock is detected, the respective magnetic head 17 from stranding the ramp 80.

Figure 13:
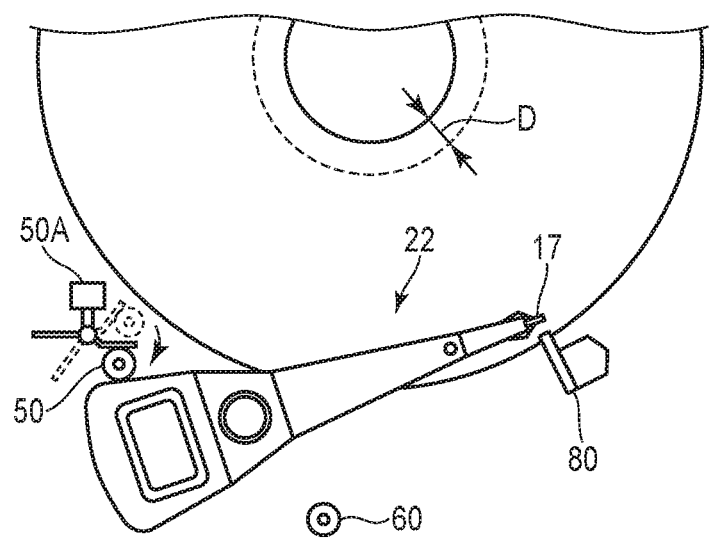
FIG. 13 is a diagram showing the second embodiment.

FIG. 13 is a diagram showing the second embodiment. In the example illustrated in FIG. 13, by moving the position of the outer stopper 50, the magnetic head 17 is inhibited from stranding the ramp 80.

The outer stopper 50 shown in FIG. 13 is movable to the head actuator 22 side. The outer stopper 50 is moved by an outer stopper drive unit 50A. For the outer stopper drive unit 50A, for example, a driving method similar to that of the electromagnetic latch described above or the latch driven by the piezo electric element may be applied. Further, in the example illustrated, the outer stopper drive unit 50A is configured to pivot on the supporting point as its axis, but the configuration of the outer stopper drive unit 50A is not limited to that of this example.

First, the shock sensor 35 shown in FIG. 1 detects a shock applied to the HDD. When the shock is detected to be greater than of the predetermined value by the shock sensor 35, the outer stopper drive unit 50A moves the outer stopper 50 to the head actuator 22 side. While the outer stopper 50 is moved to the head actuator 22 side, when the outer stopper 50 and the head actuator 22 abut against each other, the magnetic head 17 is located on an inner side with respect to the ramp 80.

Figure 14:
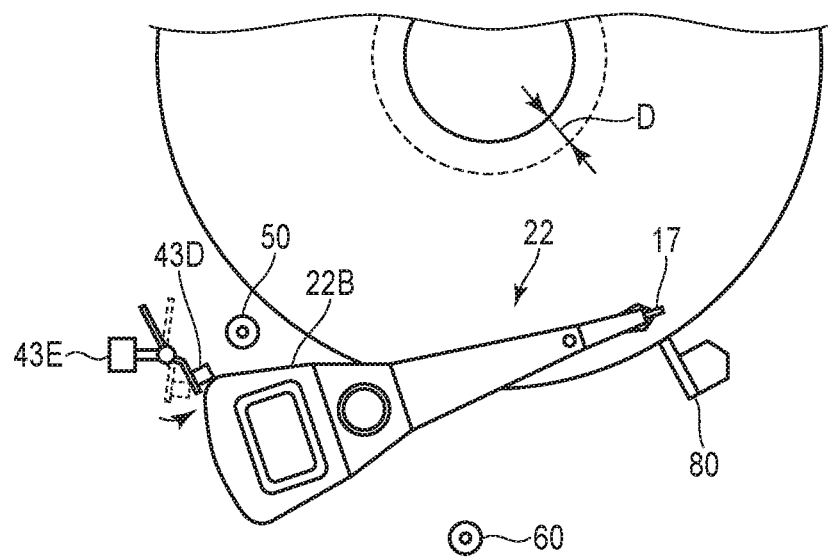
FIG. 14 is a diagram showing the first modified example of the second embodiment.

FIG. 14 is a diagram showing the first modified example of the second embodiment. The first modified example shown in FIG. 14 is different from the second embodiment shown in FIG. 13 in that a latch 43D is used to inhibit the magnetic head 17 from stranding the ramp 80.

First, the shock sensor 35 shown in FIG. 1 detects a shock applied to the HDD. When the shock is detected to be greater than of the predetermined value by the shock sensor 35, a latch drive unit 43E moves the latch 43D to the head actuator 22 side. The latch 43D is moved to a position opposing a side surface 22B of the head actuator 22. The side surface 22B of the head actuator 22 opposes the outer stopper 50. While the latch 43D abutting against the side surface 22B of the head actuator 22, the magnetic head 17 is located on an inner side with respect to the ramp 80.

Third Embodiment

The third embodiment is configured to retract the magnetic head 17 to or further than the predetermined distance D when it is located in an inner circumferential side of the magnetic disk 18 and also to inhibit the head from stranding the ramp 80 when located in an outer circumferential side thereof.

Figure 15:
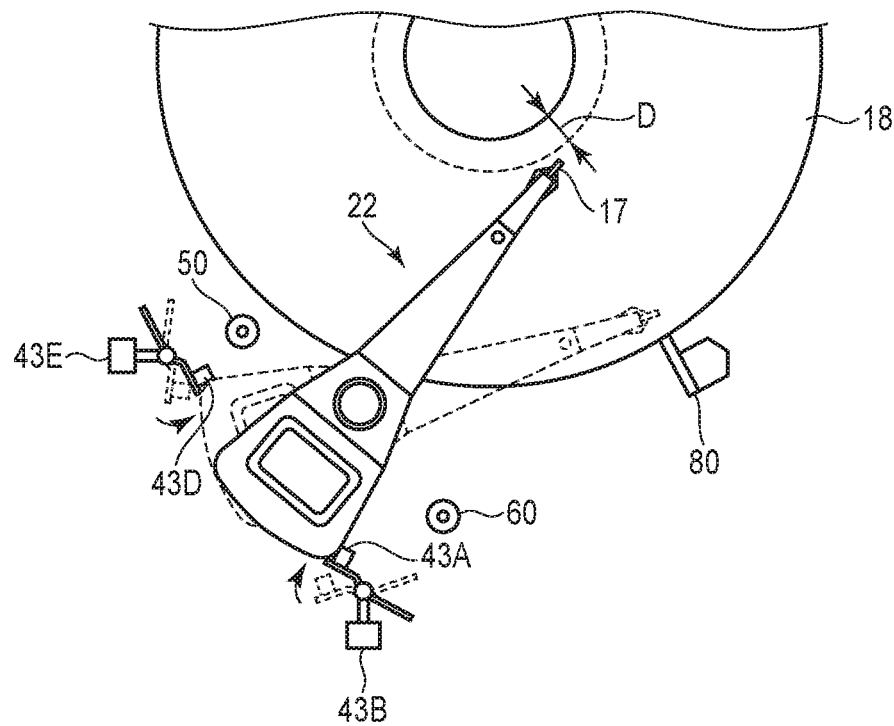
FIG. 15 is a diagram showing the third embodiment.

FIG. 15 is a diagram showing the third embodiment.

The configuration shown in FIG. 15 includes the configuration of the latch 43A shown in FIG. 12 and the configuration of the latch 43D shown in FIG. 14. For example, for the latch 43A on the inner stopper 60 side and the head actuator 22, an operation similar to that shown FIG. 12 is performed. As the latch 43A is moved to the head actuator 22 side, the latch 43D is also moved to the head actuator 22 side. Thus, when a shock is detected, the magnetic head 17 is retracted from within the predetermined distance D, and also the magnetic head 17 can be inhibited from stranding the ramp 80.

Fourth Embodiment

The fourth embodiment is configured to set the position of the inner stopper 60 in advance so that the magnetic head 17 is not located on an inner circumferential side with respect to the predetermined distance D.

Figure 16:
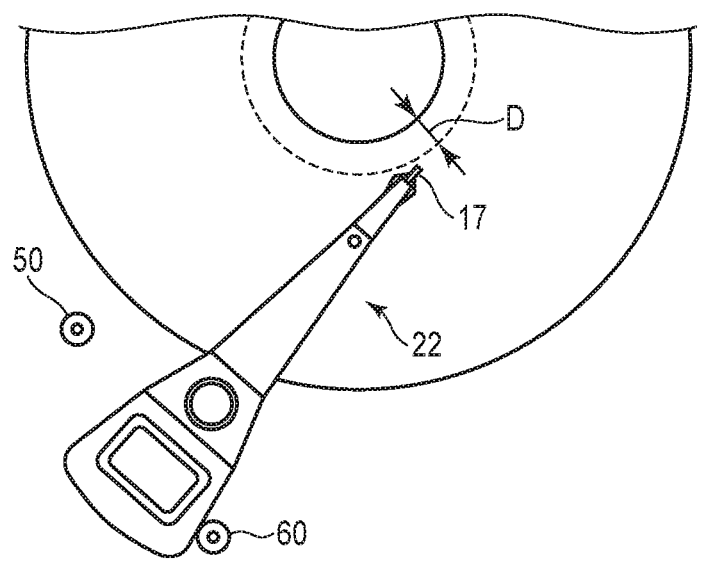
FIG. 16 is a diagram showing the fourth embodiment.

FIG. 16 is a diagram showing the fourth embodiment. While the head actuator 22 abutting against the inner stopper 60, the magnetic head 17 is located in a position at or further from the predetermined distance D. That is, the position of the inner stopper 60 is set so that the magnetic head 17 is not located in an inner circumferential side with respect to the predetermined distance D. Such a configuration can be employed in a HDD to be used under the environment that vibration is applied thereto at all times.

As discussed above, according to the present embodiments, a disk device can be obtained, which can inhibit a magnetic head and a respective magnetic disk from being brought into contact with each other if a shock is applied, thus preventing damaging of the magnetic disk.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
a base;
a discoidal recording medium supported rotatably by the base and including an innermost circumferential portion supported and an outer circumferential edge;
a head which carries out data processing with respect to the recording medium;
a head actuator provided pivotably on the base and supporting the head movably between the innermost circumferential portion and the outer circumferential edge;
a first sensor which detects a shock applied; and
a drive unit which pivots, when the shock detected by the first sensor is greater than a predetermined value and the head is located at a position less than a predetermined distance from the innermost circumferential portion, the head actuator to place the head at a position more than the predetermined distance,
the predetermined distance satisfying a conditional formula below:

$$D = 9.83 e^{-210 \frac{t^2}{G}}$$

where
D: the predetermined distance from the innermost circumferential portion,
t: a thickness of the recording medium, and
G: a value of the shock.

2. The disk device of claim 1, comprising:

a clamp spring which clamps the recording medium; and a spacer-ring located coaxially with the clamp spring and in contact with the recording medium, wherein the innermost circumferential portion of the recording medium is defined by one of an outermost circumferential position of the clamp spring, being in contact with the recording medium and an outermost circumferential position of the spacer-ring, which is located on an outer circumferential side.

3. The disk device of claim 1, wherein the drive unit comprises a voice coil provided in the head actuator, and a magnet provided to oppose the voice coil.

4. The disk device of claim 1, comprising:

a latch supported by the base so as to be movable to a side of the head actuator; and a latch drive unit which moves the latch, wherein the head actuator comprises an engagement portion with which the latch is engageable, and the latch drive unit moves the latch to the side of the head actuator to engage with the engagement portion when the shock detected by the first sensor is greater than the predetermined value.

5. The disk device of claim 1, comprising:

a latch supported by the base so as to be movable to a side of the head actuator;

a latch drive unit which moves the latch; and an inner stopper which regulates pivoting of the head actuator, wherein the latch drive unit moves, when the shock detected by the first sensor is greater than the predetermined value, the latch to the side of the head actuator, to abut against the head actuator between the inner stopper and the head actuator.

6. The disk device of claim 4, wherein the latch is an electromagnetic latch or a latch driven by a piezoelectric element.

7. The disk device of claim 1, comprising:

an inner stopper supported by the base so as to be movable to a side of the head actuator, wherein the drive unit is an inner stopper drive which pivots the head actuator by pushing the inner stopper against the head actuator when the shock detected by the first sensor is greater than the predetermined value.

8. The disk device of claim 1, wherein the predetermined distance is 10 mm or less.

9. The disk device of claim 1, wherein the thickness of the recording medium is 0.8 mm or less.

10. The disk device of claim 1, comprising:

a second sensor which detects a position of the head with respect to the recording medium, wherein the drive unit pivots the head actuator based on information detected by the second sensor, indicating that the head is located less than the predetermined distance from the innermost circumferential portion.

* * * * *